(12) United States Patent
Hara

(10) Patent No.: US 7,046,320 B2
(45) Date of Patent: May 16, 2006

(54) OPTICAL ELEMENT AND SURFACE LIGHT SOURCE DEVICE USING THE SAME, AS WELL AS LIQUID CRYSTAL DISPLAY

(75) Inventor: Kazutaka Hara, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 108 days.

(21) Appl. No.: 10/386,935

(22) Filed: Mar. 13, 2003

(65) Prior Publication Data
US 2004/0085660 A1  May 6, 2004

(30) Foreign Application Priority Data
Mar. 14, 2002  (JP) .............................. 2002-070176

(51) Int. Cl.
*G02F 1/1335* (2006.01)
(52) U.S. Cl. ..................................... 349/105
(58) Field of Classification Search ........ 349/104–108; 359/493, 502
See application file for complete search history.

(56) References Cited

U.S. PATENT DOCUMENTS

| | | | | |
|---|---|---|---|---|
| 3,518,373 A | * | 6/1970 | Cushera et al. ............. | 348/834 |
| 4,278,736 A | * | 7/1981 | Kamerling .................. | 428/437 |
| 4,355,871 A | * | 10/1982 | Nevyas et al. .............. | 351/212 |
| 4,515,442 A | * | 5/1985 | Aron .......................... | 359/485 |
| 4,747,674 A | * | 5/1988 | Butterfield et al. ......... | 359/590 |
| 4,896,218 A | * | 1/1990 | Vick ........................... | 348/835 |
| 5,576,854 A | * | 11/1996 | Schmidt et al. ................ | 349/5 |
| 5,596,246 A | * | 1/1997 | Budzilek et al. ............ | 313/502 |
| 5,844,637 A | * | 12/1998 | Katsumata ..................... | 349/8 |
| 6,124,971 A | * | 9/2000 | Ouderkirk et al. ........... | 359/487 |
| 6,403,223 B1 | * | 6/2002 | Albro et al. ................. | 428/421 |
| 6,478,429 B1 | * | 11/2002 | Aritake et al. ................ | 353/31 |
| 6,641,874 B1 | * | 11/2003 | Kuntz et al. .................. | 428/29 |
| 6,806,642 B1 | * | 10/2004 | Pires et al. .................. | 313/506 |
| 2002/0018153 A1 | * | 2/2002 | Kitabayashi .................. | 349/40 |
| 2002/0034009 A1 | * | 3/2002 | Broer et al. ................. | 359/497 |
| 2004/0095531 A1 | * | 5/2004 | Jiang et al. .................. | 349/115 |
| 2004/0233524 A1 | * | 11/2004 | Lippey et al. ............... | 359/443 |

FOREIGN PATENT DOCUMENTS

| | | |
|---|---|---|
| JP | S54-51858 A | 4/1979 |
| JP | S55-46707 A | 4/1980 |
| JP | H01-108503 A | 4/1989 |
| JP | H02-17 A | 1/1990 |
| JP | H05-100114 A | 4/1993 |
| JP | H05-289076 A | 11/1993 |
| JP | H10-50124 A | 2/1998 |
| JP | H10-339867 A | 12/1998 |
| JP | H11-64841 A | 3/1999 |
| JP | H11-212034 A | 8/1999 |
| JP | 2002-90535 | 3/2002 |
| JP | 2002-258048 | 9/2002 |

\* cited by examiner

*Primary Examiner*—Kenneth Parker
(74) *Attorney, Agent, or Firm*—Westerman, Hattori, Daniels & Adrian LLP

(57) ABSTRACT

An optical element 11 includes a bandpass filter made of a lamination of thin films respectively having different refraction factors so as to selectively allow light emitted from a backlight 6 to pass therethrough, and a polarizer 3, a quarter-wavelength plate 2 located between the bandpass filter 6 and the polarizer 3 so as to prevent light incident from the side of the polarizer 3 from being reflected by the bandpass filter 1 and then emitted from the side of the polarizer 3.

55 Claims, 10 Drawing Sheets

F I G. 9
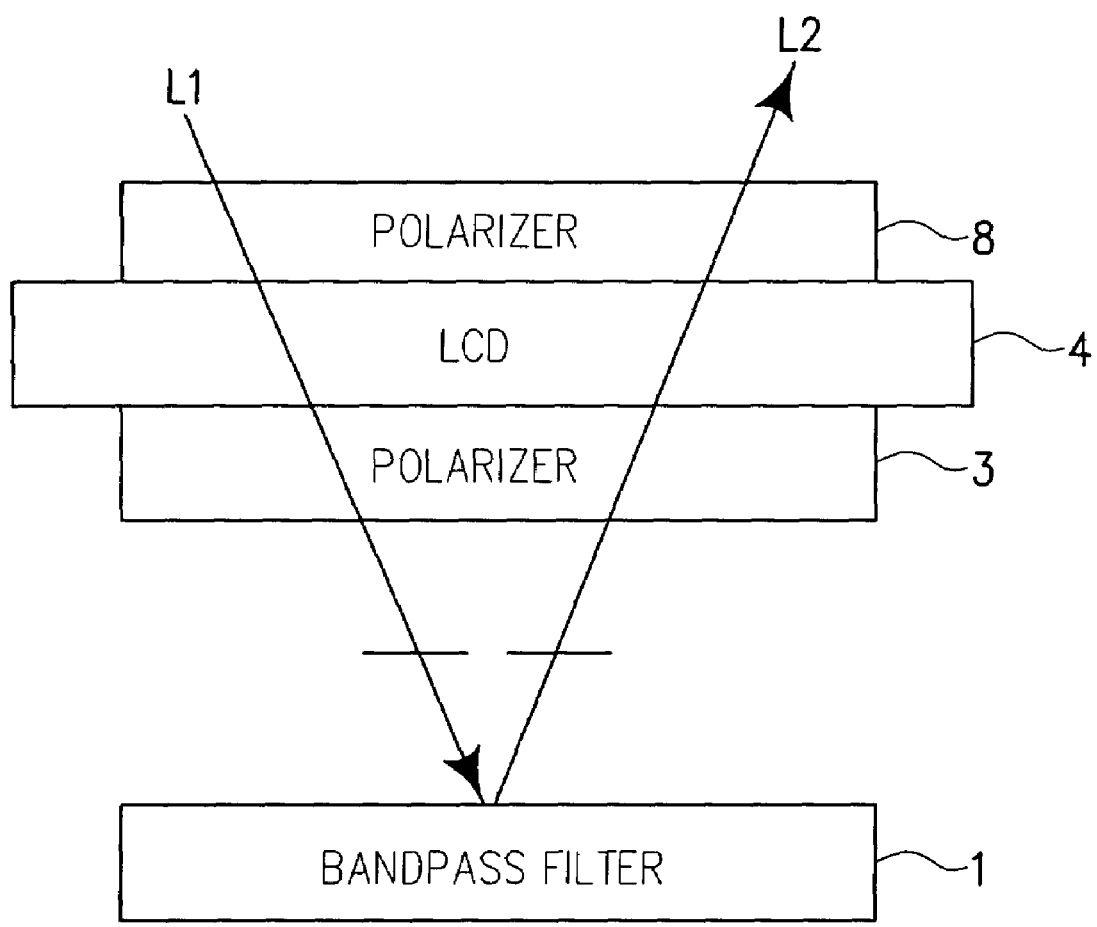

OPTICAL ELEMENT AND SURFACE LIGHT SOURCE DEVICE USING THE SAME, AS WELL AS LIQUID CRYSTAL DISPLAY

FIELD OF THE INVENTION

This invention relates to an optical element of a bandpass-filter-type, which is capable of forming a surface light source device having an excellent forward directivity, which is suitable for use in a liquid crystal display, and more particularly to an optical element, which prevents reflection of light, which has been emitted from a liquid crystal cell and reached a surface of a bandpass filter, from being visually recognized, thereby enabling limiting deterioration in display quality of a liquid crystal display.

BACKGROUND OF THE INVENTION

A surface light source device such as an EL (Electric Luminescence) backlight, CCFL (Cold Cathode Fluorescent Lamp) backlight, and LED (Light Emitting Diode) backlight used in a liquid crystal display usually has a peak at a certain wavelength.

Accordingly, by arranging a bandpass filter (interference filter), which reflects a certain wavelength of light emitted from a backlight in case of oblique incident light, while allows it to pass through the bandpass filter in case of perpendicular incident light, on a light emitting side, the perpendicular incident light passes through the bandpass filter, while the oblique incident light does not pass therethrough but is reflected thereon. As a result, light can be parallelized (oriented in parallel).

According to the aforesaid bandpass filter, unlike to the light paralleling technique, which utilizes a conventional light shielding plate, non-parallel light rays are not absorbed but reflected, and then returned towards the backlight. Herein, the reflected oblique incident light is returned to the backlight and re-reflected towards the bandpass filter. Then, only a forward component of the re-reflected light passes through the bandpass filter. Accordingly, by a so-called light recycling effect enabling repeating the above actions, the forward (perpendicular) light intensity of the re-reflected light, which passes through the bandpass filter, is enhanced. Thus, it is possible to produce a surface light source device that is capable of emitting parallel light rays at high efficiency.

Herein, the wavelength characteristics of the light interference in the bandpass filter is varied according to the incident angle, that is, the selective wavelength allowed through the bandpass filter is varied according to the incident angle, so that the parallelism of the parallel light rays can be controlled by the transmission center wavelength and the transmission wavelength width (half band width). For example, where a narrow transmission wavelength width (half band width) has been set, passing light is converged only at an extremely narrow point and its proximity on the front side. Thus, a surface light source device with a high parallelism can be produced.

On the other hand, where a broad transmission wavelength width (half band width) has been set, it is possible to make the parallelism approximate to the parallelism produced when a conventionally and commercially available prism sheet for luminance improvement has been used. Herein, given the use of a prism sheet, which utilizes light refraction in an air interface in principle, it cannot be attached to a backlight or liquid crystal cell. However, unlike to the prism sheet, the bandpass filter does not require an air interface and therefore can be integrally attached to a backlight or liquid crystal cell, thereby achieving ease of handling of the entire device. Also, the bandpass filter, which has a smooth surface, can be subjected to hard coat treatment or the like, thereby achieving a scratch proof surface and thus enabling more ease of handling of the entire device. Contrarily to this, the prism sheet, which utilizes refraction on the surface, is hard to be subjected to any scratch prevention treatment such as a hard coat treatment. In view of this, it is a great advantage to utilize a bandpass filter for parallelizing light of a backlight.

As an optical element utilizing such a bandpass filter, for example, those utilizing a cholesteric liquid crystal have been proposed for example in Japanese patent application nos. 2001-60005 and 2000-281382, by which a surface light source device that achieves parallelized light (concentrated light) can be produced.

On the other hand, as a bandpass filter used for parallelizing light of a backlight, it is a matter of course that not only those utilizing the cholesteric liquid crystal but also those made of lamination of vapor-deposited thin films respectively having different refraction factors or those made of lamination of thin films of resin compositions respectively having different refraction factors can be used. Such a bandpass filter is arranged on the emitting side of the backlight so as to achieve an improved efficiency in parallelizing light of a backlight and an improved light utilization efficiency.

A bandpass filter made of lamination of vapor-deposited thin films or thin films of resin compositions is advantageous in the fact that it has excellent heat and chemical resistance in comparison with a bandpass filter utilizing a cholesteric liquid crystal, thus exhibiting high practical value.

However, a liquid crystal display having a bandpass filter, which is made of lamination of vapor-deposited thin films or thin films of resin compositions and arranged on the emitting side of the backlight, poses a problem that incident light from the display side of the liquid crystal display (that is, the opposite side to the side on which the backlight is arranged) reflects on the surface of the bandpass filter and is visually observed as return light, thus deteriorating the display quality of the liquid crystal display.

More specifically, as illustrated in FIG. 9, when in white display, external light L1 introduced from the display side of a liquid crystal display reaches a bandpass filter 1 through a polarizer 8, a liquid crystal cell 4 and a polarizer 3, reflects on the surface of the bandpass filter 1 and is visually recognized as return light L2. Accordingly, where an image of the periphery of the liquid crystal display is mirror-likely reflected thereon, or an anti-glare layer is provided on the surface of the polarizer 8, the mirror-likely reflected image is spread over a large area on the anti-glare layer, or reflected colors of the bandpass filter 1 are visually recognized. These phenomena pose a problem to substantially deteriorate the display quality of the liquid crystal display.

SUMMARY OF THE INVENTION

The present invention has been conceived to solve the above problems. It is an object of the present invention to provide an optical element that is capable of preventing reflection of light, which has reached the surface of the bandpass filter, from being visually recognized, and limiting deterioration in display quality of the liquid crystal display.

In order to achieve the above object, according to the present invention, there is provided an optical element that includes a bandpass filter made of a lamination of thin films respectively having different refraction factors so as to selectively allow light emitted from a backlight to pass therethrough, and a polarizer, a quarter-wavelength plate located between the bandpass filter and the polarizer so as to prevent light incident from the side of the polarizer from being reflected by the bandpass filter and then emitted from the side of the polarizer.

According to the aforesaid invention, light incident from the side of the polarizer (light, which passed through the polarizer, turns into linear polarized light) turns into circularly polarized light by passing through the quarter wavelength plate, and reaches the surface of the bandpass filter. The circularly polarized light as reflected on the bandpass filter has a rotational direction reversed, and again passes trough the quarter wavelength plate so as to turn into linear polarized light having a plane of polarization perpendicular to the incident light. Since the reflected light has a perpendicular plane of polarization, it does not pass through the polarizer. As a result, the liquid crystal display with the optical element arranged on the emitting side of the backlight can enhance the forward directivity by the bandpass filter of the optical element, while preventing light incident from the display side (the side of the polarizer) and then returned, from being visually recognized so as to limit the deterioration in display quality. Also, according to the invention of claim 1, unlike the case where light is prevented from returning by using a semi-absorbent and semi-transparent material made of conventional pigment, dyes, etc., an influence on the quantity of light passing through the optical element except for a little absorption of light by the quarter wavelength plate is not caused, thus providing an excellent advantage. Since the bandpass filter inherently does not absorb light, even increased luminance of the backlight does not cause heat resulting from light absorption to transfer through the bandpass filter to the liquid crystal cell, thereby adding the advantage of blocking the heat transfer by the bandpass filter.

The quarter wavelength plate may be formed by such as stretching of a resin film having the anisotropy of a double refraction, coating of thin liquid crystal polymer films, or cutting of a crystallized material. Also, as the quarter wavelength plate, those optimized for a certain short wavelength of light or broadband enabled by lamination with a half wavelength plate, or a phase difference plate with a phase difference controlled in the thickness direction may be used.

Preferably, the optical element further includes a half wavelength plate, which is located between the polarizer and the quarter wavelength plate and has an axis different from the axes thereof.

A narrowband-wavelength quarter plate produces a function as the quarter wavelength plate only to a certain wavelength of light, and gradually loses the function as the quarter wavelength plate since a difference between an intended phase difference and an actual phase difference is caused to a longer wavelength side and a shorter wavelength side relative to the certain wavelength, thus gradually losing the function as the quarter wavelength plate. Particularly in the case where the bandpass filter has a characteristics allowing different wavelengths of light to pass therethrough (in this case, a reflection hue is neutralized), the narrowband-wavelength quarter plate exhibits its function only for a certain wavelength of light, and poses a difficulty in effectively preventing the return light incident from the display side (the side of the polarizer) from being visually recognized. According to the present invention of claim 2, a half wavelength plate is provided between the polarizer and the quarter wavelength plate so as to produce a broadband quarter wavelength plate (the combination of the quarter wavelength plate and the half wavelength plate) that exhibits its function for the entire range of wavelengths of visible light, as commonly known, and therefore it is possible to effectively prevent return light from being visually recognized even when the reflection hue of the bandpass filter is neutralized.

Preferably, at least one of the quarter wavelength plate and the half wavelength plate has a refractive index controlled in the thickness direction so as to have an improved angle of visibility.

Where the quarter wavelength plate, the half wavelength plate or the like is a regular phase difference plate, phase difference is caused only in the in-plane direction, and therefore it functions as designed against perpendicular incident light, but has a phase difference value varied against oblique incident light, since the pass length of the oblique incident light is increased. According to the present invention of claim 3, at least one of the quarter wavelength plate and the half wavelength plate has a refractive index controlled in the thickness direction of the wavelength plate, and more specifically, controlled so as to cause a phase difference in the thickness direction, thereby enabling application of the same phase difference as that for the perpendicular incident light to the oblique incident light. The phase difference value in the thickness direction can be controlled by stretching in the thickness direction, biaxial stretching, or orientation of a liquid crystal material (i.e., molecular designing enabling occurrence of the phase difference in the thickness direction).

Preferably, the quarter wavelength plate has a phase difference set so as to have a value corresponding to a reflection hue of the bandpass filter.

Where the bandpass filter has a characteristics that enables a mono-wavelength of light to pass therethrough, the reflection hue of the bandpass filter forms a complementary color relationship with the short wavelength of light. Since the phase difference of the quarter wavelength plate is set to have a value corresponding to the reflection hue of the bandpass filter (the set value is easily calculated since the reflection hue has a complementary color relationship with the transmission wavelength of the bandpass filter), it is possible to effectively prevent the reflection hue of light from being visually recognized as return light.

At least one of the quarter wavelength plate and the half wavelength plate may be made of such as a liquid crystal polymer material.

Preferably, the optical element is formed by bonding the constitutional members (the bandpass filter, the quarter wavelength plate (the half wavelength plate may be included), and the polarizer) thereof to each other by adhesive so as to remove an air interface.

Although the optical element can function even with its constitutional members (the bandpass filter, the quarter wavelength plate (the half wavelength plate may be included), and the polarizer) located away from each other, they are preferably integrally bonded together by adhesive or the like, when considering handling capability of the entire optical element, the reflection loss at an air interface and the like. For example, where the bandpass filter, the quarter wavelength plate and the polarizer are located away from each other, four air interfaces exist, thereby causing the reflection loss of about 4(%)×4 (sides)=16%, and somewhat deteriorating the display quality due to the existence of the reflected light at the air interfaces. Where the respective members are bonded together as recited in claim 6, the reflection loss becomes substantially 0% and therefore produces a desirable effect to improve the optical transmittance and the display quality, respectively.

The bandpass filter may be formed by laminating together thin films made of inorganic oxides, dielectric materials or metal oxides respectively having different refraction factors by vacuum vapor deposition, electron-beam codeposition or sputtering.

Alternatively, the bandpass filter may be formed by laminating together thin films of a resin composition respectively having different refraction factors. In this case, the resin composition can be formed into a thin film structure by one-axis stretching or biaxial stretching after it has been extruded into a multilayer structure.

The bandpass filter may be formed by crushing the lamination of the bandpass filter into scaly flakes and embedding them in a resin.

Preferably, the optical element further includes a scattering plate located between the bandpass filter and the backlight.

According to the above invention, light obliquely incident and then reflected on the bandpass filter is scattered by the scattering plate so that a part of the scattered light (a component incident perpendicularly to the bandpass filter) can be reused, thereby enhancing efficient utilization of light emitted from the backlight.

Preferably, the scattering plate has an uneven surface on a side thereof facing the backlight.

Where the scattering plate is located closer to the backlight, a Newton ring may be caused by light interference between the scattering plate and the backlight. According to the present invention, the backlight-facing surface of the scattering plate is unevenly formed, so that the occurrence of a Newton ring is limited and therefore the quality of the backlight can be maintained.

Preferably, the bandpass filter is made of a substrate and a thin film laminate on the substrate, in which the substrate has an in-plane phase difference of not more than 30 nm between the plane of light incident and the plane of light emission. Particularly, as described later, where a so-called reflection polarizer is disposed between the bandpass filter and the backlight in an attempt to increase the quantity of light passing through the bandpass filter, the substrate of the bandpass filter is suitable since it has a small phase difference. The in-plane phase difference is preferably not more than 20 nm, and more preferably not more than 10 nm.

Preferably, the bandpass filter sets plural selective wavelengths allowed through, and is set so that the incident angles of the respective wavelengths of light, each causing a certain ratio of reflection, are coincident with each other.

According to the present invention as described above, it is possible to limit variation in hue based upon the angle of visibility in a liquid crystal display.

According to the present invention, there is also provided a surface light source device that includes the optical element, and a backlight that has a three-band cold cathode lamp as a light source so as to emit surface light on the optical element.

According to the present invention, there is also provided a surface light source device that includes the optical element, and a backlight that has a light emitting diode as a light source so as to emit surface light having at least one emission wavelength.

Preferably, the bandpass filter sets plural selective wavelengths allowed through, and has an emission spectrum intensity of the light source of the backlight adjusted according to the transmittance in each of the plural selective wavelengths so that light emitted from the bandpass filter is visually neutralized. In other words, where light emitted from the bandpass filter has been visually recognized, it is adjusted in such a manner as to be recognized as white.

Also, according to the present invention, there is provided a surface light source device that includes the optical element, and a backlight that has an electroluminescence element as a light source so as to emit surface light on the optical element.

Still yet according to the present invention, there is provided a liquid crystal display that includes a liquid crystal cell and the surface light source device for illuminating the liquid crystal cell.

BRIEF DESCRIPTION OF THE DRAWINGS

FIG. 9 is an explanatory view for explaining the state where reflection of light reached the surface of the bandpass filter is visually recognized in a conventional liquid crystal display.

DETAILED DESCRIPTION OF THE PREFERRED EMBODIMENTS

An embodiment of the present invention will be hereinafter described with reference to the drawings.

Figure 1:
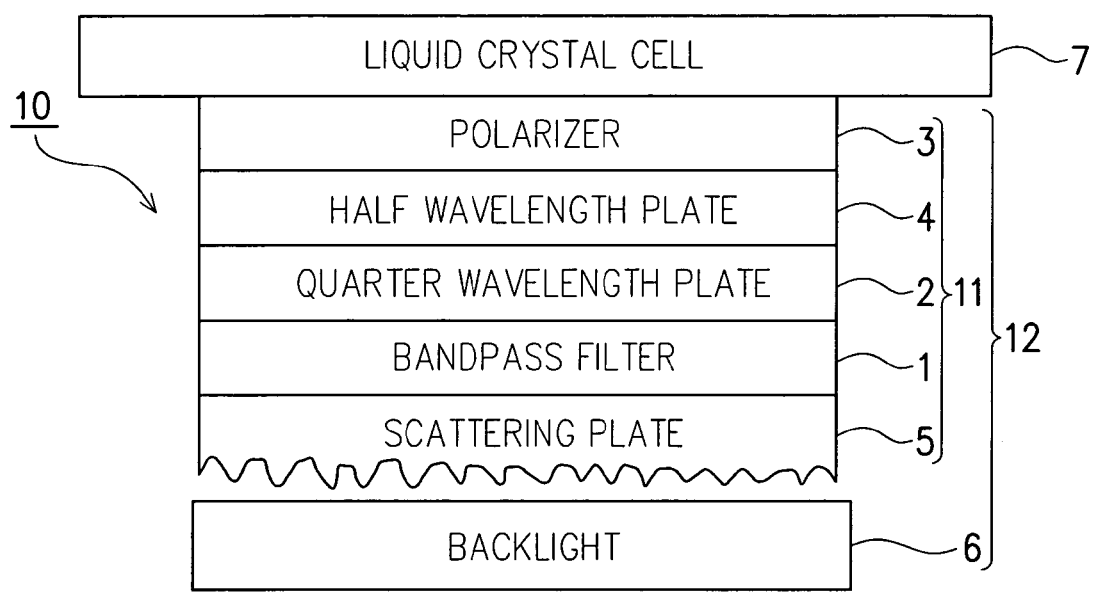
FIG. 1 is a vertically cross section view schematically illustrating a structure of a liquid crystal display provided with an optical element according to one embodiment of the present invention.

FIG. 1 is a vertically cross section view schematically illustrating a structure of a liquid crystal display provided with an optical element according to an embodiment of the present invention. As illustrated in FIG. 1, a liquid crystal display 10 of this embodiment includes a backlight 6, a liquid crystal cell 7 and an optical element 11 for guiding light emitted from the backlight 6 to the liquid crystal cell 7, in which the backlight and the optical element 11 together serve as a surface light source device 12 for illuminating the liquid crystal cell 7.

The optical element 11 includes a bandpass filter (interference filter) for selectively allowing light emitted from the backlight 6 to pass therethrough, a quarter wavelength plate 2 and a polarizer 3. The optical element 11 of this embodiment preferably further includes a half wavelength plate 4 located between the polarizer 3 and the quarter wavelength plate 2, and a scattering plate 5 located between the bandpass filter 1 and the backlight 6. In this embodiment, in consideration of handling capability of the entire optical element 11 and reflection loss at air interfaces, the respective members (scattering plate 5, bandpass filter 1, quarter wavelength plate 2, half wavelength plate 4, polarizer 3) are integrally bonded together by adhesive or the like.

The backlight 6 has such as a three-band cold cathode lamp, a light emitting diode or an electroluminescence element as a light source so as to emit surface light on the optical element. As the backlight 6, in addition to a so-called direct backlight as illustrated in FIG. 1, it is possible to employ a so-called sidelight backlight having a light source located on the lateral side so as to emit surface light via an optical transmission member.

The quarter wavelength plate 2 and the half wavelength plate 4, which together form the optical element 11, each are formed by stretching of a resin film having the anisotropy of a double refraction, coating of thin liquid crystal polymer films, or cutting of a crystallized material.

Figure 2:
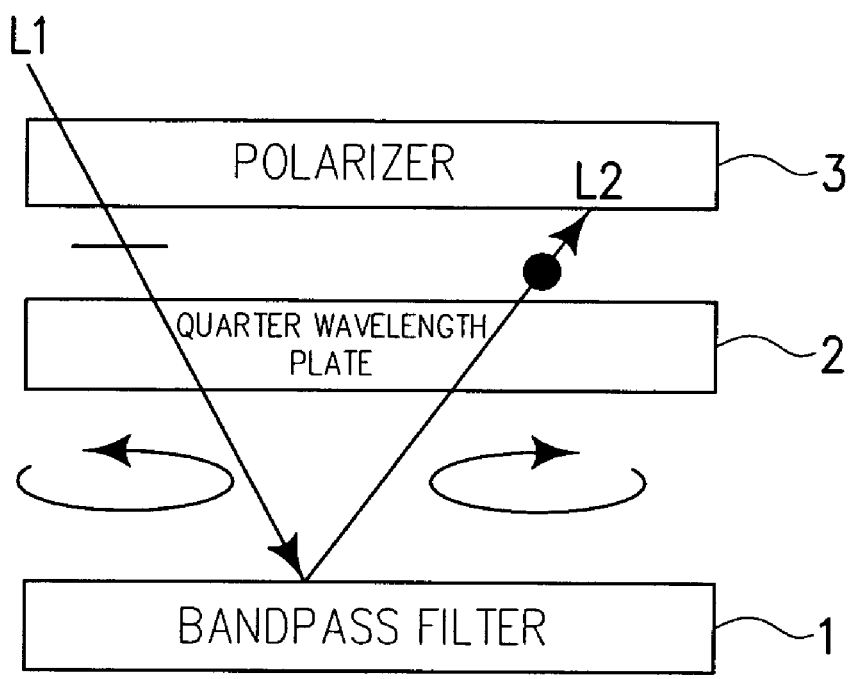
FIG. 2 is an explanatory view for explaining why a quarter wavelength plate as illustrated in FIG. 1 prevents return light from being visually recognized.

In the optical element 11 of this embodiment, the quarter wavelength plate 2 is located between the bandpass filter 1 and the polarizer 3, thereby preventing light, which is incident from the polarizer 3 and then returned, from being visually recognized as return light, and hence enabling limiting deterioration in display quality. That is, as illustrated in FIG. 2, light L1 incident from the side of the polarizer 3 (light passed through the polarizer 3 turns into linearly polarized light) turns into circularly polarized light after passing through the quarter wavelength plate 2, and then reaches the surface of the bandpass filter 1. Light L2 reflected on the bandpass filter 1 turns into oppositely circularly polarized light, again passes through the quarter wavelength plate 2, and hence turns into linearly polarized light having a plane of polarization perpendicular to the incident light L1. Accordingly, the reflected light L2, which has a perpendicular plane of polarization, cannot pass through the polarizer 3. Thus, it is possible to prevent return light from being visually recognized.

Figure 3:
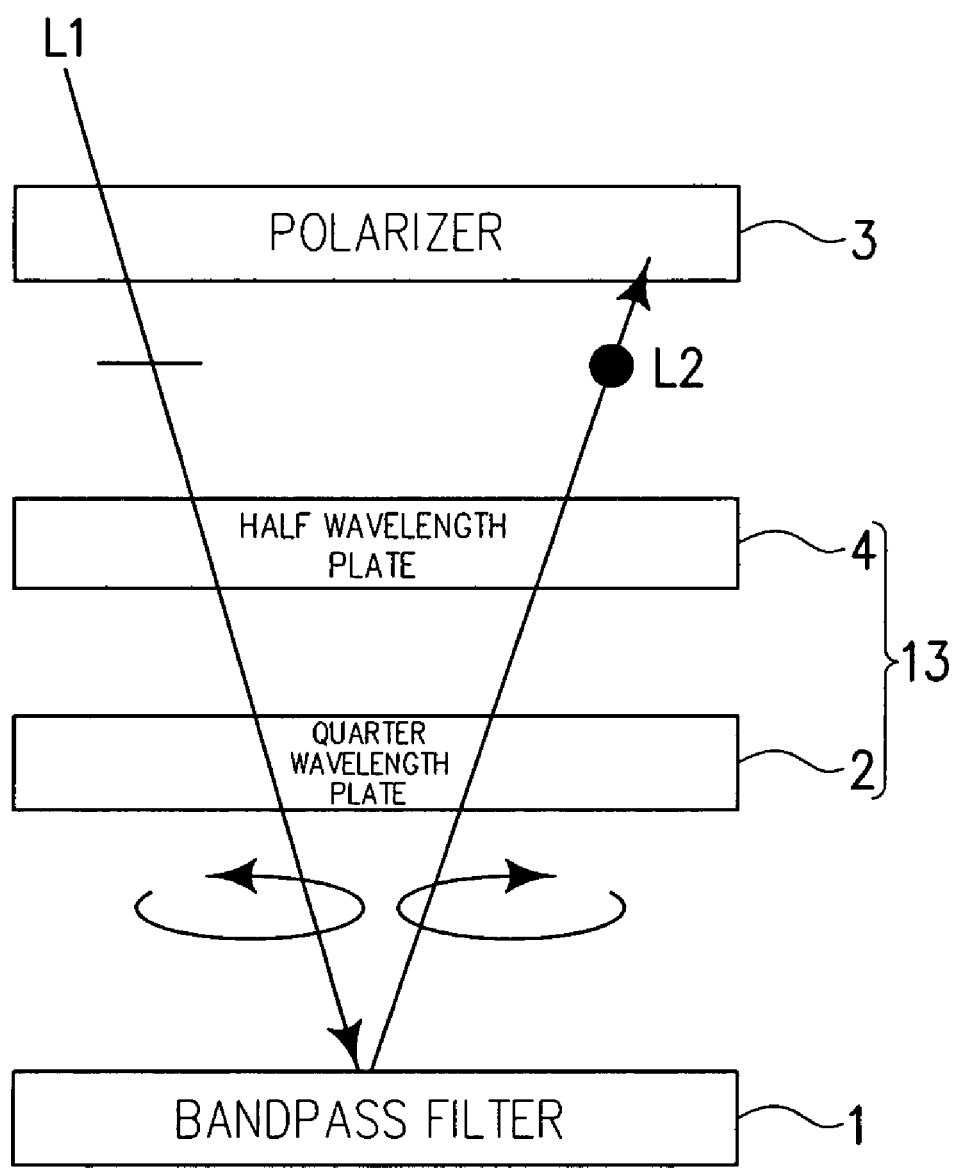
FIG. 3 is an explanatory view for explaining why the combination of the quarter wavelength plate of FIG. 1 and a half wavelength plate also prevents return light from being visually recognized.

In this embodiment, the half wavelength plate 4 is located between the polarizer 3 and the quarter wavelength plate 2, in which, as illustrated in FIG. 3, the combination of the quarter wavelength plate and the half wavelength plate constitutes a broadband quarter wavelength plate that is capable of fulfilling the function as the quarter wavelength plate throughout the entire visible light range. Accordingly, for example, even where the bandpass filter 1 has characteristics to allow plural wavelengths of light to pass therethrough (in this case, the reflection hue of the bandpass filter 1 is neutralized), it is possible to effectively prevent return light having a broad range of wavelengths from being visually recognized.

The scattering plate 5 constituting the optical element 11 is provided so as to enhance efficient utilization of light emitted from the backlight by reusing a part of light (a component incident perpendicularly to the bandpass filter 1), which light has been obliquely incident to the bandpass filter 1, reflected thereon and scattered by the scattering plate 5. The scattering plate 5 may be formed with an uneven surface so as to achieve light scattering function or by a method, in which fine particles having different refraction factors are embedded in a resin substance. In this connection, particularly where the scattering plate 5 is located closer to the backlight 6, light interference in a clearance between the scattering plate 5 and the backlight 6 may cause an Newton ring. The scattering plate 5 of this embodiment is formed so as to have an uneven surface on the side facing the backlight 6, which limits occurrence of the Newton ring and hence maintains the quality of the backlight 6.

The bandpass filter 1 constituting the optical element 11 is formed by laminating two or more thin film layers on a transparent substrate, in which the thin film layers respectively have different refraction factors and each designed to have a thickness of about 1⅛ of the wavelength of passing light. Whereby, repeated reflections and interferences between the layers occur so that the bandpass filter 1 possesses a property to reflect a predetermined wavelength of light or allow it to pass therethrough.

Now, the description will be made for an example of the bandpass filter 1 applicable in this embodiment.

(1) Case where thin films made of a vapor deposited material are laminated

A metal oxide, dielectric material or the like such as $TiO_2$, $ZrO_2$ or ZnS for a high refraction material, and a metal oxide, dielectric material or the like such as $SiO_2$, $MgF_2$, $Na_3AlF_6$ or $CaF_2$ for a low refraction material are respectively used, and these materials having different refraction factors are vapor-deposited on the transparent substrate. Thus, the bandpass filter 1 is produced.

(2) Case where thin films made of a resin composition are laminated

For example, a halogenated resin composition represented by polyethylene naphthalate, polyethylene terephthalate, polycarbonate, vinyl carbazole and brominated acrylate, a high refractive index resin material such as a resin composition with ultrafine particles of a high refractive index inorganic material embedded therein, a fluorocarbon resin material represented by such as trifluoroethyl acrylate, and a low refractive index resin material such as an acrylic resin represented by polymethyl methacrylate may be used, in which these materials having such different refractive indexes are laminated on the transparent substrate, thus producing the bandpass filter 1.

It is possible that a thin film laminate produced in each of the above items (1) and (2) is crushed into scaly flakes, which are in turn embedded in a resin. While the material of the transparent substrate used in the above (1) and (2) is not limited to a specific one, a polymer, a glass material or the like is generally used. As examples of the polymer, it can be cited a cellulosic polymer such as cellulose diacetate and cellulose triacetate, polyester polymer such as polyethylene terephthalate and polyethylene naphthalate, polymer such as polyolefin polymer and polycarbonate polymer, and the like.

Where a so-called reflection polarizer (which reflects light having a plane of polarization perpendicular to a plane of polarization of a polarizer located on the side of the backlight of the liquid crystal cell 7) is located between the bandpass filter 1 and the backlight 6 (the scattering plate 5 in this embodiment) so as to increase the quantity of light passing through the bandpass filter 1, it is preferable to use, as the transparent substrate, a film of cellulose triacetate, nonoriented polycarbonate, nonoriented polyethylene terephthalate or norbornene resin, each having a small phase difference.

Now, the description will be made in detail for the setting procedure for setting a selective wavelength allowed through the bandpass filter 1.

The bandpass filter 1 of this embodiment is set to exhibit a maximum transmittance (a wavelength exhibiting a maximum transmittance will be referred to a maximum transmission wavelength) at a wavelength corresponding to a peak wavelength in the emission spectrum of the backlight 6, while having a reflection wavelength with a 50% or more cut rate (a wavelength having a reflectance of not less than 50%) on the longer wavelength side than the maximum transmission wavelength.

As described later, the parallelism of light passing through the bandpass filter 1 is varied according to the difference between the reflection wavelength and the maximum transmission wavelength, so that this difference can be arbitrarily set based upon each purpose.

That is, the reflection wavelength with a 50% or more cut rate according to the incident angle θ of light into the bandpass filter 1 is approximately derived from the following equation (1):

$$\lambda 2=\lambda 1 \times (1-(n0/ne)^2 \times \sin^2 \theta)^{1/2} \quad (1)$$

wherein λ1 represents a value of the reflection wavelength, which reflects 50% or more of perpendicular incident light, λ2 represents a value of the reflection wavelength, which reflects 50% or more of light with θ incident angle, n0 represents a refractive index of an external medium (1.0 for the air interface), ne represents an effective refractive index of the bandpass filter 1 and θ represents an incident angle.

According to the above equation (1), for example, where the reflection wavelength λ1=555 nm and the effective refractive index of the bandpass filter 1 ne=2.0 for a peak wavelength of 545 nm in the emission spectrum of the backlight 6, while they are arranged with leaving air interfaces, the incident angle θ, which enables the reflection wavelength λ2=545 nm, is about ±22 degrees. That is, as far as the incident angle θ is within an angular range of about ±22 degrees, it is possible to obtain a transmittance of 50% or more. Contrarily, as far as the incident angle θ is out of the angular range of about ±22 degrees, λ2 is smaller than 545 nm(λ2<545 nm). As a result, light of the backlight 6a having a peak wavelength of 545 nm, which is on the longer wavelength side than the aforesaid λ 2, 50% or more does not pass through the bandpass filter 1. Likewise, when the reflection wavelength λ1=547 nm, the incident angle θ, which enables the reflection wavelength λ2=545 nm, is about ±10 degrees, while the incident angle θ, which enables the reflection wavelength λ2=545 nm is about ±5 degrees when the reflection wavelength λ1=545.5 nm.

Thus, it is possible to freely control the parallelism of light passing through the bandpass filter by setting the maximum transmission wavelength of the bandpass filter 1 (peak wavelength in the emission spectrum of the backlight 6) and the reflection wavelength λ1.

Where plural peak wavelengths exist in the emission spectrum of the backlight 6, the same setting procedure can be applied to each wavelength. For example, where a light source of the backlight 6 is a three-band cold cathode lamp, peak wavelength is frequently set at 435 nm for blue light, 545 nm for green light and 610 nm for red light. Accordingly, the reflection wavelength λ1 of the bandpass filter 1 can be set for each peak wavelength. Specifically, in the above case, the reflection wavelength λ1 is set at 436.6 nm for blue light, 547 nm for green light and 612.3 nm for red light, so that the incident angle θ range becomes about ±10 degrees regardless of the color. That is, regardless of the color, it is possible to control the parallelism of light passing through the bandpass filter 1 so as to be within an angular range of about ±10 degrees relative to the front.

While the maximum transmittance of each wavelength in the bandpass filter 1 may be varied according to the designed film quality, it is possible to allow the backlight 6 to have an emission spectrum intensity matched to the maximum transmittance of each wavelength by adjusting the amount of a fluorescent material in each color of the light source, which makes up the backlight 6, making the backlight 6 match to the maximum transmittance at each wavelength, or adjusting the power supply to each light emitting diode of the light source (plural light emitting diodes), which constitutes the backlight 6, thus adjusting the hue of passing light.

EXAMPLES

The feature of the present invention can become more apparent by presenting examples and comparative examples as stated below.

Example 1

Twenty thin films of a dielectric material made of $ZrO_2$/$SiO_2$ were laminated together so as to prepare a bandpass filter having a center wavelength of 545 nm, which exhibits the maximum transmittance, and a half band width of about 10 nm. As a substrate, which serves as a base for lamination, a glass plate having a thickness of 0.4 mm was used.

Figure 4A:
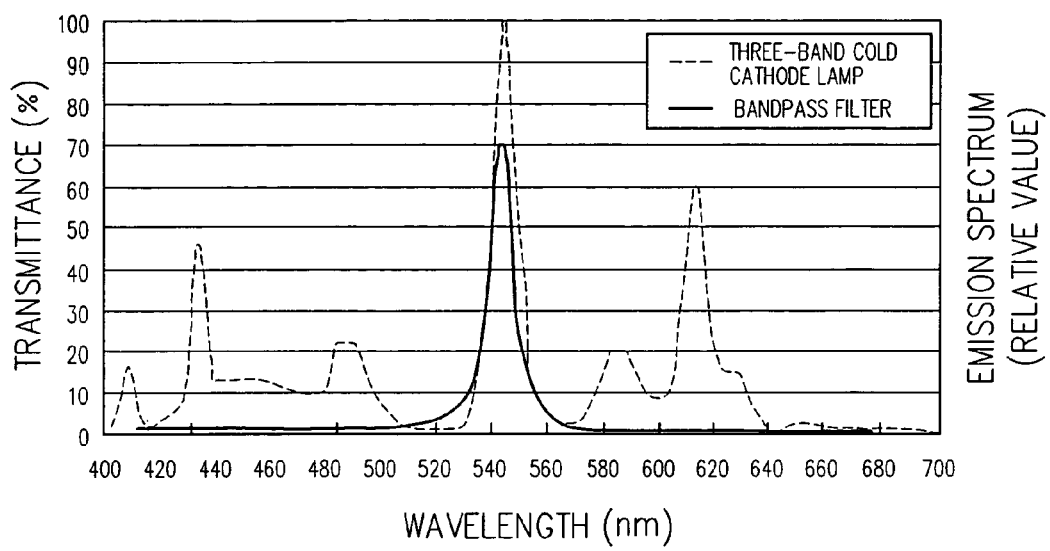
FIG. 4 is a view illustrating spectral characteristics of a bandpass filter and a light source in a first example, and distribution of emitted light.
Figure 4B:
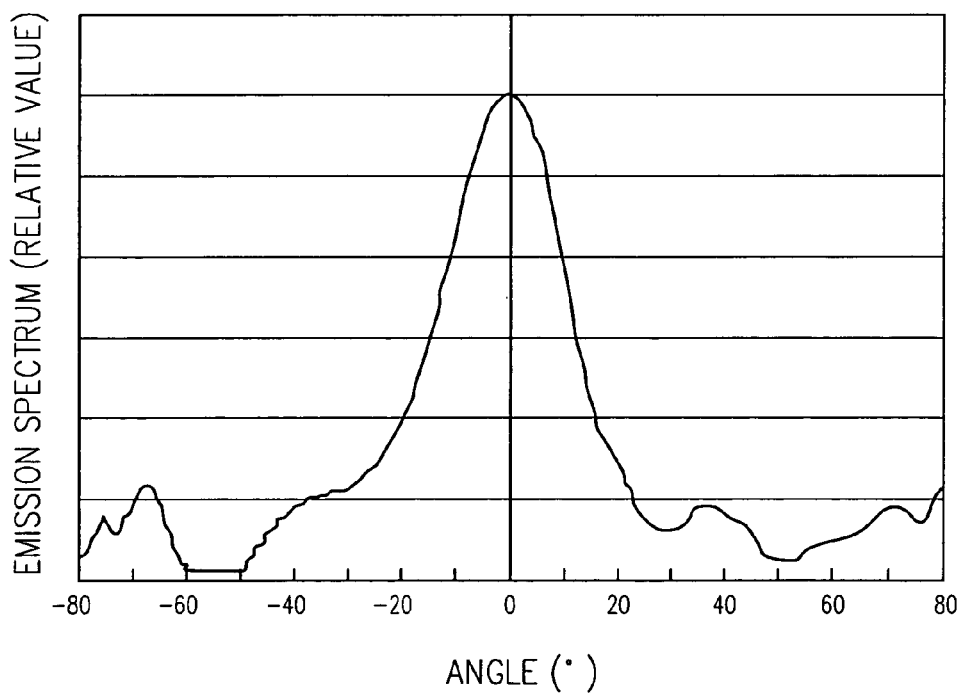

A backlight with a three-band cold cathode lamp as a light source having the maximum emission spectrum at a wavelength of 545 nm was located as opposed to the bandpass filter. This backlight is green and has a property that emitted light is concentrated within an angular range of ±14 degrees relative to the front, as illustrated in FIG. 4(b).

The bandpass filter of this example reflects light having a wavelength other than a wavelength of around 545 nm. Accordingly, where this bandpass filter is located between a polarizer fixed on the side of the backlight of the liquid crystal cell and the backlight, external light incident from the display side of the liquid crystal display passes through the liquid crystal cell, reaches the bandpass filter, and reflected thereon when in a white display. Thus, the reflected light is likely to be visually recognized. In order to prevent the reflection of light, a quarter wavelength plate is located between the bandpass filter and the polarizer. In this example, it is necessary to prevent light reflection for the entire range of visible light other than a wavelength of around 545 nm. Therefore, in this example, a broadband quarter wavelength plate (the combination of a quarter wavelength plate and a half wavelength plate) was used.

Figure 10:
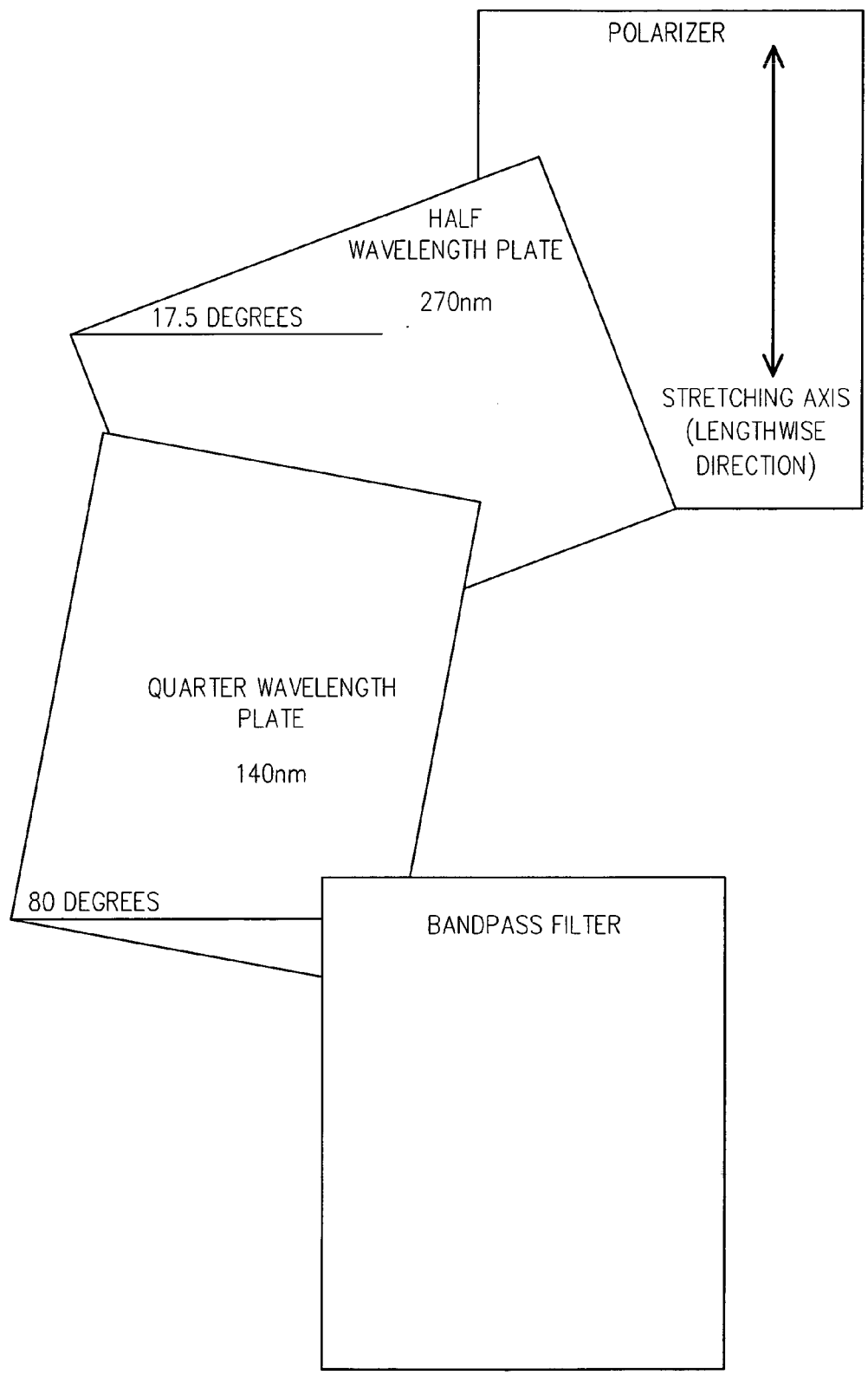
FIG. 10 is an explanatory view for explaining a laminated state of a polarizer, a half wavelength plate and a quarter wavelength plate of the first example of the present invention.

More specifically, in the relationship to the axial angle as illustrated in FIG. 10, (the lengthwise direction of each of the half wavelength plate and the quarter wavelength plate corresponds to the stretching axis of each wavelength plate), a laminate comprising a quarter wavelength plate having a phase difference value of 140 nm and a half wavelength plate having a phase difference value of 270 nm was located between the bandpass filter and the polarizer. As phase difference plates (quarter wavelength plate and half wavelength plate), NRF film manufactured by Nitto Denko Ltd. (phase difference values: 140 nm, 270 nm) was used, and as the polarizer, SEG1465DU manufactured by Nitto Denko Ltd. was used. In FIG. 10, since the bandpass filter itself does not have polarizing characteristics, the lamination angle is not specifically defined. Also, the phase difference values and the lamination angles as shown in FIG. 10 are presented merely as examples, and therefore not meant to serve as limit values.

According to the optical element having the above structure, external light incident from the side of the polarizer (light having passed through the polarizer turns into linear polarized light) turns into circularly polarized light after having passed through the broadband quarter wavelength plate, and reaches the surface of the bandpass filter. Light reflected on the bandpass filter has a rotational direction reversed, and again passes through the broadband quarter wavelength plate so as to turn into linear polarized light having a plane of polarization perpendicular to the incident light. Since the reflected light has a perpendicular plane of polarization, it is absorbed by the polarizer and therefore prevented from being visually recognized. Particularly, in the arrangement of this example using the broadband enabled quarter wavelength plate, reflection of strong incident light was not visually recognized, and even in an environment where it is used at the window with strong external light being entered, the reflection of an image of a fluorescent light of an interior lighting is likely to occur, their reflections were not colored and therefore not visually recognized.

Example 2

Figure 5A:
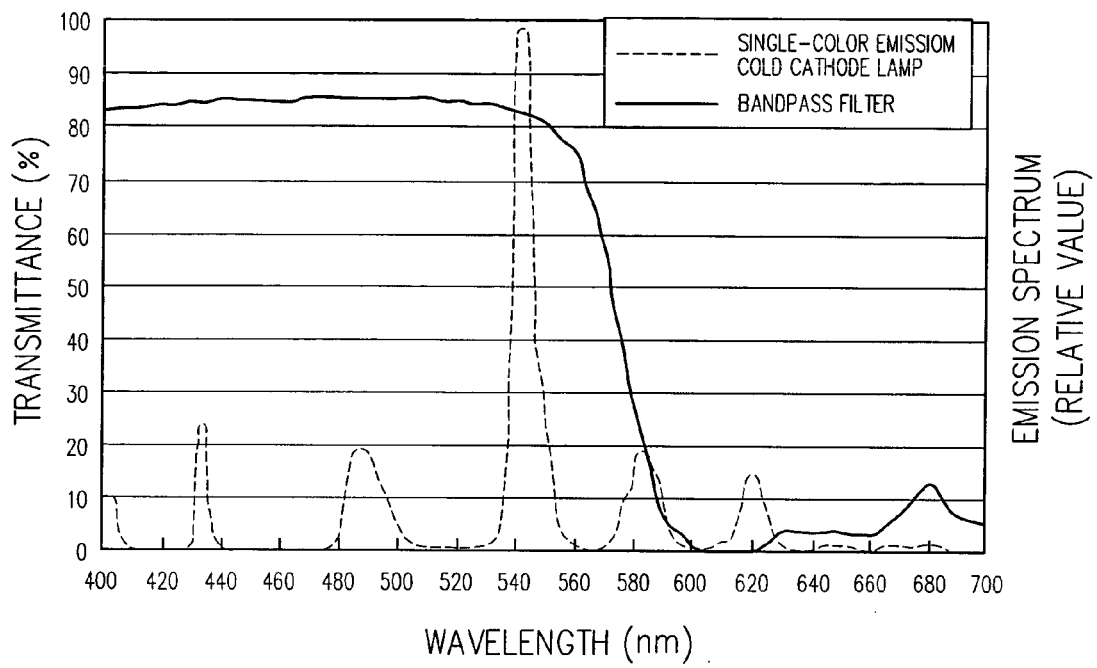
FIG. 5 is a view illustrating spectral characteristics of a bandpass filter and a light source in a second example, and distribution of emitted light.

Twenty thin films of a dielectric material made of $ZrO_2$/$SiO_2$ were laminated together so as to prepare a short-wavelength pass bandpass filter (dichroic color filter) having a half wavelength value of 580 nm, as illustrated in FIG. 5(a). As a substrate, which serves as a base for lamination, a glass plate having a thickness of 0.4 mm was used.

A backlight with a single-color emission cold cathode lamp as a light source having the maximum of an emission line spectrum at a wavelength of 545 nm was located as opposed to the dichroic color filter, as illustrated in FIG. 5(a).

As in this example, where an emission spectrum of the backlight is limited to a single, specific wavelength (545 nm), and the reflection band of the dichroic color filter is limited to the long wavelength side, the reflection color of the dichroic color filter is colored. Therefore, it is possible to produce a sufficient reflection prevention effect by effecting reflection prevention mainly for a wavelength range having this reflection hue (a red hue in this example). From this point of view, in this example, a monolayer, phase difference plate made of polycarbonate (NRF film manufactured by Nitto Denko Ltd., phase difference value: 150 nm), serving as a quarter wavelength plate, was located between the dichroic color filter and the polarizer fixed on the side of the backlight of the liquid cell. A phase difference value in this arrangement produces an effect of preventing reflection of light having a wavelength of around 600 nm, which displays a red coloration.

It is possible to produce reflection prevention effect by the arrangement that the quarter wavelength plate is laminated on the polarizer with the drawing axis of the quarter wavelength plate being tilted 45 degrees relative to the absorption axis of the polarizer. As the polarizer, SEG1465DU manufactured by Nitto Denko Ltd. was used.

Figure 5B:
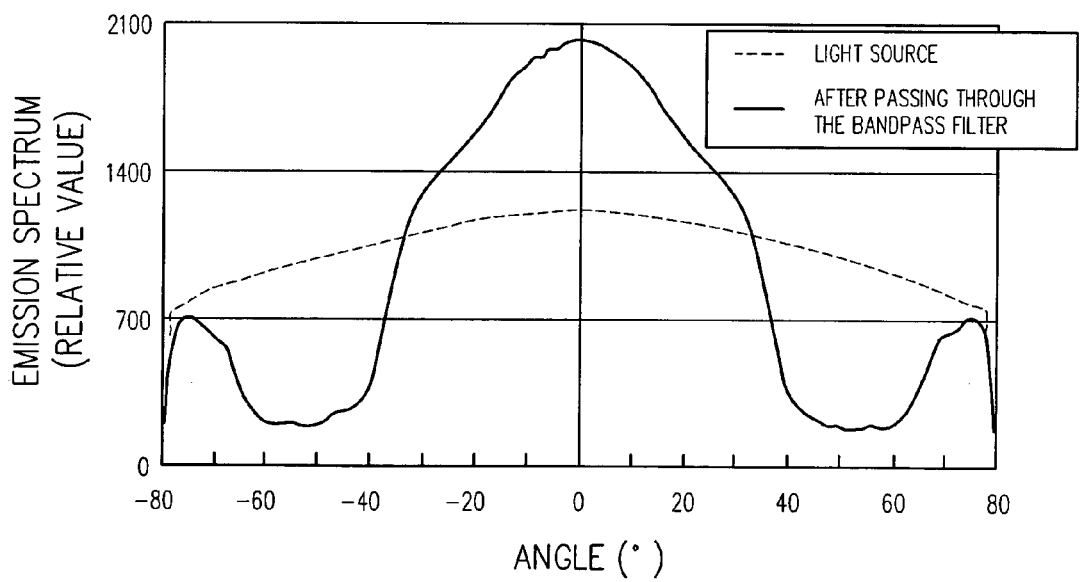

The result was that the distribution of light emitted from the thus arranged optical element was concentrated within an angular range of ±30 degrees relative to the front, as illustrated in FIG. 5(b), and, even in case where a liquid crystal display was exposed to strong incident light incident from the side of the polarizer, coloration due to reflection was not visually recognized on the liquid crystal display when in a white display.

Example 3

Figure 6:
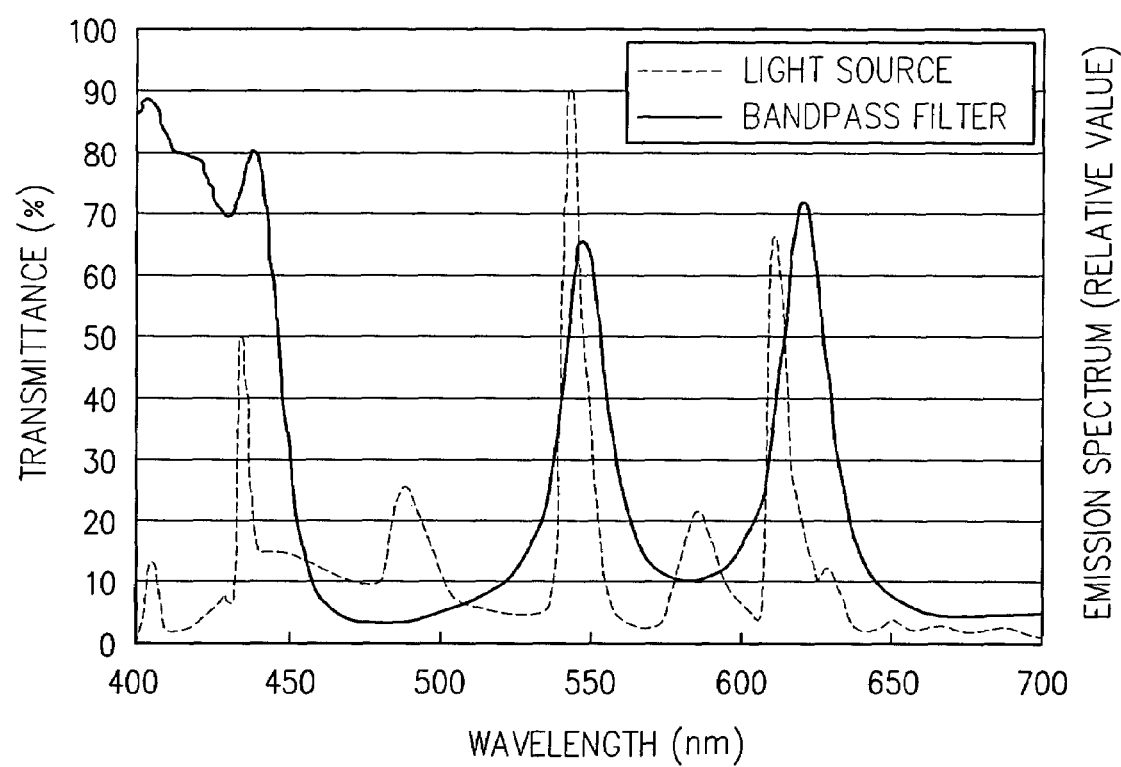
FIG. 6 is a view illustrating spectral characteristics of a bandpass filter and a light source in a third example, and distribution of emitted light.

Twenty-one thin films of $TiO_2$/$SiO_2$ were laminated together by vapor deposition so as to prepare a bandpass filter (interference filter) exhibiting a high transmittance for three wavelengths of an emission spectrum of a three-band cold cathode lamp, while reflecting different wavelengths of light, as illustrated in FIG. 6(a). As a substrate, which serves as a base for lamination, a PET film (LUMIRROR manufactured by Toray Industries, Inc. thickness: 75 μm) was used.

With the above bandpass filter, there was exhibited a light condensing characteristics that light emitted from a backlight with the three-band cold cathode lamp as a light source is reflected when it is out of an incident angle range of about ±20 degrees relative to the perpendicular direction, and returned towards the backlight.

As in this example, where a bandpass filter, which allows three wavelengths of light to pass through and reflects different wavelengths of light, is to be used, it is necessary to make the reflection preventing function adapt to broadband, thereby achieving reflection prevention for the entire visible light range, in the same manner as the first example. From this point of view, in this example, the same arrangement as that of the first example, in which a broadband quarter wavelength plate for reflection prevention was also located between a bandpass filter and a polarizer fixed on the side of a backlight of a liquid cell. In the same manner as the first example, as phase difference plates (the quarter wavelength plate and the half wavelength plate), NRF film manufactured by Nitto Denko Ltd. (phase difference values: 140 nm, 270 nm) was used, and as the polarizer, SEG1465DU manufactured by Nitto Denko Ltd. was used.

The result was that the distribution of light emitted from the thus arranged optical element and the refection prevention effect were of the same level as those of the first example, that is, exhibited light condensing characteristics that light emitted therefrom was concentrated within an angular range of ±30 degrees relative to the front, and, even in case where a liquid crystal display was exposed to strong external light incident from the side of the polarizer, a reflected image due to reflection on the bandpass filter was not visually recognized on the liquid crystal display when in a white display.

Example 4

Twenty thin films of polyethylene naphthalate (PEN)/polymethyl methacrylate (PMMA) were laminated together, while having thicknesses of alternate layers controlled by a feedblock method, and this lamination was biaxially oriented. The stretching temperature was about 140° C. and the stretching ratio was about 4 times in the TD direction and was about 3 times in the TM direction.

Five stretched products which were thus produced, each comprising twenty-layer laminated film, were laminated together to form a lamination of 100 layers in total, which was then adjusted to act as a short-wavelength pass bandpass filter (dichroic color filter) having reflection characteristics in the wavelength range of not less than 650 nm but not more than 900 nm.

The thus prepared dichroic color filter had a reflectance of not less than 50% at a wavelength of 635 nm. As opposed to this dichroic color filter, a backlight with a high-luminance AlGaInP LED as a light source, which had an emission spectrum with a center wavelength of 630 nm was located. The same conditions as those of the second example were applied to a quarter wavelength plate, a polarizer, and their locations used in this example.

The distribution of light emitted from the thus arranged optical element was of substantially the same degree. Coloration due to reflection on the dichroic color filter was not visually recognized on a liquid crystal display when in a white display.

Example 5

Figure 7:
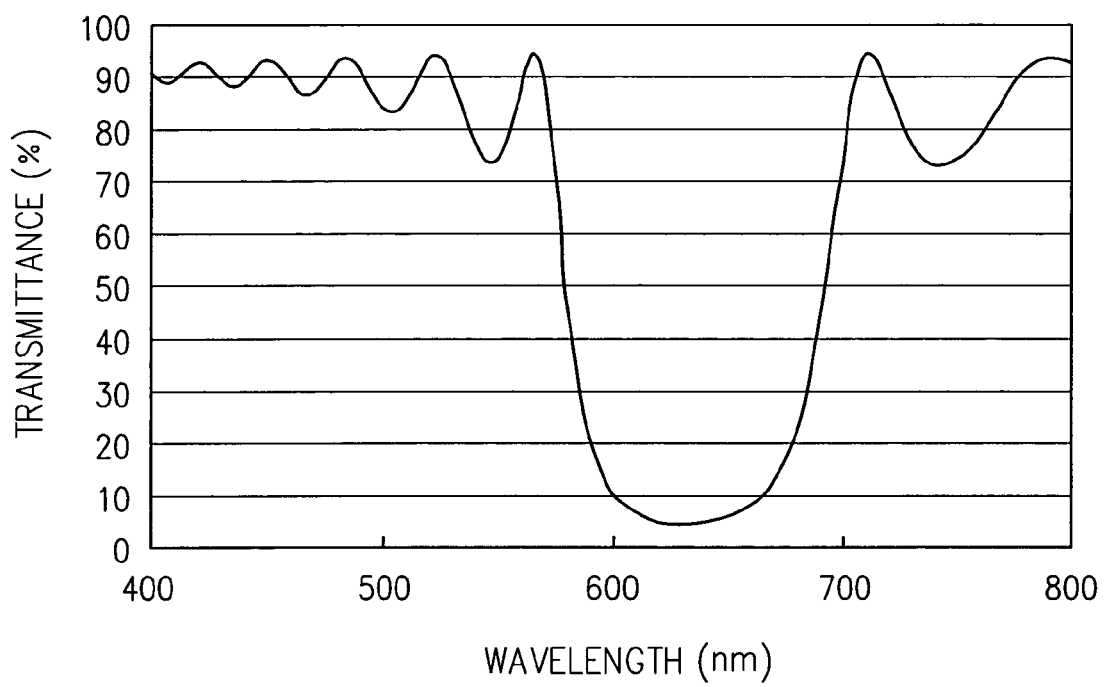
FIG. 7 is a view illustrating transmission spectral characteristics of the bandpass filter in a fifth example.

Fluorinated acrylate resin (LR202B manufactured by Nissan Chemical Industries, Ltd.) having a refractive index of about 1.40 was used as a low refraction material, and acrylate resin with ultrafine particles of a high refractive index inorganic material embedded therein (DeSolite manufactured by JSR Corporation) having a refractive index of about 1.71 was used as a high refractive index resin. Eighteen layers of them were laminated on a substrate (TAC film (TD-TAC) manufactured by Fuji Photo Film Co., Ltd.) by multilayer thin film deposition so as to prepare a short-wavelength pass bandpass filter (dichroic color filter) as illustrated in FIG. 7. The thus prepared dichroic color filter had a half wavelength value of about 580 nm.

The multilayer thin film deposition was conducted by using a micro gravure coater by repeating the steps of drying each laminated film at 90° C. for one minute, curing it by ultraviolet polymerization (50 mW/cm$^2$×1 sec), and coating another film on the cured film. The thus prepared film exhibited insufficient homogeneity in in-plane transmission spectrum characteristics and therefore a region thereof, which had proper characteristics for an applicable wavelength range, was selected for use.

As opposed to the dichroic color filter, a backlight with a three-band cold cathode lamp as a light source, which has the maximum emission spectrum at a wavelength of 545 nm, was located. As in the same manner as the second example, a quarter wavelength plate and a polarizer were located.

Light emitted from the thus arranged optical element was so distributed that it was concentrated within an angular range of ±40 degrees relative to the front, and the same reflection prevention effect as the second example was produced. Coloration due to reflection was not visually recognized on a liquid crystal display when in a white display.

Example 6

Figure 8:
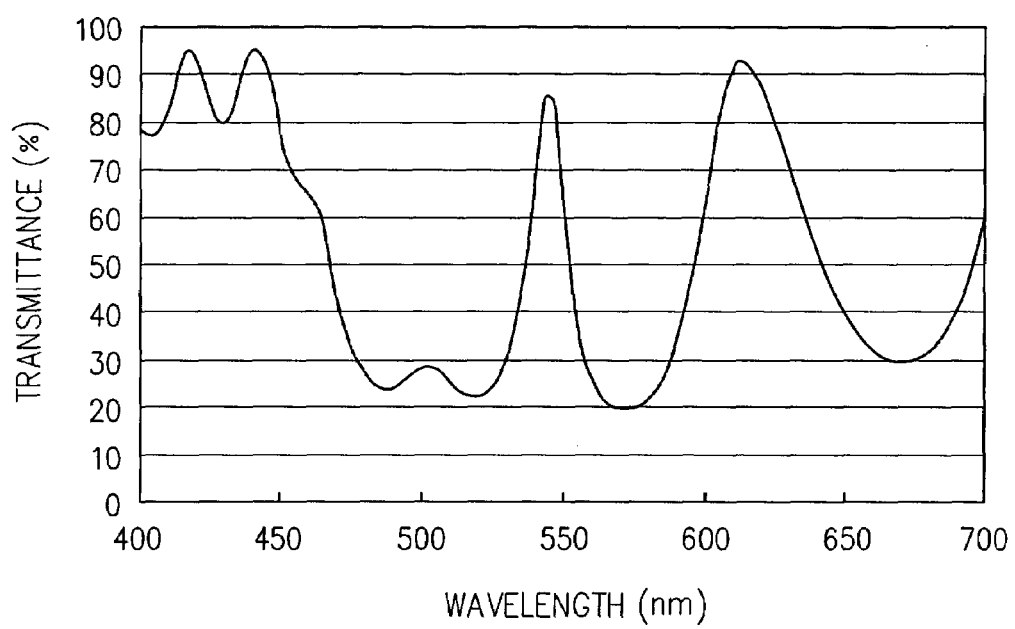
FIG. 8 is a view illustrating transmission spectral characteristics of the bandpass filter in a sixth example.

Fluorinated acrylate resin (LR202B manufactured by Nissan Chemical Industries, Ltd.) having a refractive index of about 1.40 was used as a low refraction material, and acrylate resin with ultrafine particles of a high refractive index inorganic material embedded therein (DeSolite manufactured by JSR Corporation) having a refractive index of about 1.71 was used as a high refractive index resin. Twenty-one layers of them were laminated on a substrate (TAC film (TD-TAC) manufactured by Fuji Photo Film Co., Ltd.) by multilayer thin film deposition so as to prepare a short-wavelength pass bandpass filter (dichroic color filter) as illustrated in FIG. 8. In the thus prepared dichroic color filter, a transmission wavelength existed in each of three regions of 435 nm, 545 nm and 610 nm so as to make the dichroic color filter adapt to each RGB color in the emission spectrum of a conventional cold cathode lamp.

The multilayer thin film deposition was conducted by using a micro gravure coater by repeating the steps of drying each laminated film at 90° C. for one minute, curing it by ultraviolet polymerization (intensity:50 mW/cm$^2$×1 sec), and coating another film on the cured film. The thus prepared film exhibited insufficient homogeneity in in-plane transmission spectrum characteristics and therefore a region thereof, which had proper characteristics for an applicable wavelength range, was selected for use.

As opposed to the dichroic color filter adapted for use at three wavelengths, a backlight with a three-band cold cathode lamp as a light source, which has the maximum emission spectrum at each of the wavelengths, was located. As in the same manner as the first example, a quarter wavelength plate and a polarizer were located.

Light emitted from the thus arranged optical element was so distributed that it was concentrated within an angular range of ±30 degrees relative to the front, and the same reflection prevention effect as the first example was produced. A reflection image due to reflection on the dichroic color filter was not visually recognized on a liquid crystal display when in a white display.

Example 7

A bandpass filter was prepared in the same manner as the third example. As opposed to the thus prepared bandpass filter, phase difference plates and a polarizer were located in the same manner as the first example, while NRZ film manufactured by Nitto Denko Ltd. (phase difference values: 140 nm and 270 nm, Nz coefficient: 0.5 for both) was used as the phase difference plates in this embodiment. The NRZ film is a phase difference film having controlled variation in phase difference value in thickness direction, so that when it is used, it is possible to render oblique incident light a phase difference equivalent to that for perpendicular incident light, and hence produce a sufficient reflection prevention effect even for incident light greatly displaced from the perpendicular direction.

According to the thus arranged optical element, even in an environment where it is used such as at the window with bright oblique incident light existing, a reflection image due to reflection on the bandpass filter was not visually recognized on the liquid crystal display when in a white display.

Example 8

A bandpass filter was prepared in the same manner as the third example. As opposed to the thus prepared bandpass filter, phase difference plates and a polarizer were located in the same manner, while the phase difference plates used in this example were prepared by precise deposition using a slit coater of liquid crystal polymer (LC242 manufactured by BASF Corporation).

Specifically, 1 wt. % of a light sensitive initiator (Irg184 manufactured by Chiba Geigy Co., Ltd.) was added to the liquid crystal polymer so as to prepare cyclopentane solution (equivalent to 20 wt. %). This solution was deposited on a substrate with a wire bar by such an amount as to have a dry thickness of 1.2 μm, dried at 90° C. for two minutes, and subjected to ultraviolet radiation (10 mW/cm$^2$×2 min). Thus, a phase difference plate having a phase difference value of about 140 nm was prepared. Similarly, a phase difference plate having a phase difference value of about 270 nm was prepared by depositing the solution on a substrate by such an amount as to have a dry thickness of about 2.5 μm. These phase difference plates are laminated together in the same manner as the first example so that they together serve as a broadband quarter wavelength plate and therefore possess a function to prevent reflection in a visible light region.

In this embodiment, as a substrate to which liquid crystal polymer is to be deposited, a bandpass filter having a surface with an alignment film was used. The alignment film was formed by depositing 2 wt. % of an aqueous solution of PVA (POVAL manufactured by Kuraray Co., Ltd.) on a surface of the bandpass filter by spin coating, drying and subjecting the same to rubbing treatment using cotton rubbing cloth. On the alignment film of this bandpass filter is formed a liquid crystal phase difference plate having a phase difference value of about 140 nm, on which 2 wt. % of an aqueous solution of PVA (POVAL manufactured by Kuraray Co., Ltd.) was deposited by spin coating. Then, the deposited solution was dried and subjected to rubbing treatment using cotton rubbing cloth. The rubbing was made twice so that the rubbing direction of the first one has an angle of 62.5 degrees relative to the rubbing direction of the second one, thereby matching the angle to the arrangement of FIG. 10 as explained in the first example (the lengthwise direction of each phase difference plate illustrated in FIG. 10 corresponds to the rubbing direction). A liquid crystal phase difference plate having a phase difference value of about 270 nm was formed on the alignment film formed by the rubbing treatment. Further, a polarizer was deposited on this phase difference plate to have an arrangement matching to the arrangement of FIG. 10 in the first example.

The phase difference plates of the optical element of this example successfully had a total thickness of only about 5 μm or less. This means that, as compared with the thickness (about 50 μm) of a quarter wavelength plate formed by an oriented film of polycarbonate, the thickness of the phase difference plate of this example can be reduced to one tenth or less. Thus, it has been found that the optical element of this example contributes to a thin-profile surface light source device. The reflection prevention effect as exhibited was of the same level as that of the third example, and a reflection image due to reflection on the bandpass filter was not visually recognized on a liquid crystal display when in a white display.

Comparative Example

Twenty thin films of a dielectric material were laminated together so as to prepare a bandpass filter having a center wavelength of 545 nm, which exhibits the maximum transmittance, and a half band width of about 10 nm. Light was emitted from a backlight with a three-band cold cathode lamp as a light source, which has a peak wavelength at a light source wavelength of 545 nm, to the bandpass filter. Light emitted from the bandpass filter was so distributed that it was concentrated within an angular range of ±14 degrees relative to the front, in the same manner as the first example. However, on a liquid crystal display using these bandpass filter and the backlight as the surface light source device, an image of the periphery of the liquid crystal display was mirror-likely reflected and visually recognized when in a white display. As a result, the display quality of the liquid crystal display was deteriorated.

In the above described examples and comparative example, there were used: MCPD 2000, Multichannel Spectrophotometer manufactured by Otsuka Electronics Co., Ltd. for measurement of a reflection wavelength range; M220, spectral ellipsometer manufactured by JASCO Corporation for evaluation of thin film characteristics; U4100, spectrophotometer manufactured by Hitachi, Ltd. for evaluation of spectrum characteristics of transmission reflection; DOT3 manufactured by Murakami Color K.K. for evaluation of characteristics of a polarizer; KOBRA21D, Birefringence Analyzer manufactured by Oji Scientific Instruments for measuring a phase difference value; and Ez Contrast manufactured by ELDIM SA for measurement of viewing angle characteristics (contrast, hue, luminance).

A liquid crystal display with the optical element of the present invention located on the emission side of a backlight is capable of enhancing forward directivity by the bandpass filter of the optical element, as well as preventing light, which was incident from the display side (polarizer side) and turned into return light, from being visually recognized. Thus, it is possible to limit deterioration in display quality.

What is claimed is:

1. An optical element comprising:
    a bandpass filter made of a lamination of thin films respectively having different refraction factors so as to selectively allow light emitted from a backlight to pass therethrough,
    a polarizer,
    a quarter-wavelength plate located between the bandpass filter and the polarizer so as to prevent light incident from the side of the polarizer from being reflected by the bandpass filter and then emitted from the side of the polarizer, and
    a half wavelength plate located between the polarizer and the quarter wavelength plate, said half wavelength plate having an axis different from the axes of the polarizer and the quarter wavelength plate,
    wherein at least one of the quarter wavelength plate and the half wavelength plate is made of a liquid crystal polymer material.

2. An optical element comprising:
    a bandpass filter made of a lamination of thin films respectively having different refraction factors so as to selectively allow light emitted from a backlight to pass therethrough,
    a polarizer, and
    a quarter-wavelength plate located between the bandpass filter and the polarizer so as to prevent light incident from the side of the polarizer from being reflected by the bandpass filter and then emitted from the side of the polarizer,
    wherein the bandpass filter is formed by crushing the lamination of the bandpass filter into scaly flakes and embedding them in a resin, wherein said bandpass filter is formed by laminating together thin films made of inorganic oxides, dielectric materials or metal oxides respectively having different refraction factors by vacuum deposition, electron-beam codeposition or sputtering.

3. An optical element comprising:
    a bandpass filter made of a lamination of thin films respectively having different refraction factors so as to selectively allow light emitted from a backlight to pass therethrough,
    a polarizer, and
    a quarter-wavelength plate located between the bandpass filter and the polarizer so as to prevent light incident from the side of the polarizer from being reflected by the bandpass filter and then emitted from the side of the polarizer,
    wherein the bandpass filter is formed by crushing the lamination of the bandpass filter into scaly flakes and embedding them in a resin, wherein said bandpass filter is formed by laminating together thin films of a resin composition respectively having different refraction factors.

4. The optical element according to claim 1, wherein at least one of the quarter wavelength plate and the half wavelength plate has a refractive index controlled in the thickness direction so as to have an improved angle of visibility.

5. The optical element according to claim 1, wherein the quarter wavelength plate has a phase difference set so as to have a value corresponding to a reflection hue of the bandpass filter.

6. The optical element according to claim 1, wherein said members constituting the optical element are bonded together by adhesive with removing an air interface.

7. The optical element according to claim 1, wherein said bandpass filter is formed by laminating together thin films made of inorganic oxides, dielectric materials or metal oxides respectively having different refraction factors by vacuum deposition, electron-beam codeposition or sputtering.

8. The optical element according to claim 1, wherein said bandpass filter is formed by laminating together thin films of a resin composition respectively having different refraction factors.

9. The optical element according to claim 8, wherein said resin composition is formed into a thin film structure by one-axis stretching or biaxial stretching after it has been extruded into a multilayer structure.

10. The optical element according to claim 1, wherein the bandpass filter is formed by crushing the lamination of the bandpass filter into scaly flakes and embedding them in a resin, wherein said bandpass filter is formed by laminating together thin films made of inorganic oxides, dielectric materials or metal oxides respectively having different refraction factors by vacuum deposition, electron-beam codeposition or sputtering.

11. The optical element according to claim 1, further comprising a scattering plate located between the bandpass filter and a backlight.

12. The optical element according to claim 11, wherein the scattering plate has an uneven surface on a side thereof facing the backlight.

13. The optical element according to claim 1, wherein the bandpass filter is made of a substrate and a thin film laminate on the substrate, said substrate having an in-plane phase difference of not more than 30 nm between the plane of light incident and the plane of light emission.

14. The optical element according to claim 1, wherein the bandpass filter sets plural selective wavelengths allowed through, and is set so that the incident angles of the respective wavelengths of light, each causing a certain ratio of reflection, are coincident with each other.

15. A surface light source device comprising the optical element according to claim 1, and a backlight that has a three-band cold cathode lamp as a light source so as to emit surface light on the optical element.

16. A surface light source device comprising the optical element according to claim 1, and a backlight that has a light emitting diode as a light source so as to emit surface light having at least one emission wavelength.

17. The surface light source device according to claim 15, wherein the bandpass filter sets plural selective wavelengths allowed through, and has an emission spectrum intensity of the light source of the backlight adjusted according to the transmittance in each of the plural selective wavelengths so that light emitted from the bandpass filter is visually neutralized.

18. A surface light source device comprising the optical element according to claim 1, and a backlight that has an electroluminescence element so as to emit surface light on the optical element.

19. A liquid crystal display comprising a liquid crystal cell, and the surface light source device according to claim 15 for illuminating the liquid crystal cell.

20. The optical element according to claim 1, wherein the bandpass filter is formed by crushing the lamination of the bandpass filter into scaly flakes and embedding them in a resin, wherein said bandpass filter is formed by laminating together thin films of a resin composition respectively having different refraction factors.

21. The surface light source device according to claim 16, wherein the bandpass filter sets plural selective wavelengths allowed through, and has an emission spectrum intensity of the light source of the backlight adjusted according to the transmittance in each of the plural selective wavelengths so that light emitted form the bandpass filter is visually neutralized.

22. The optical element according to claim 2, wherein a half wavelength plate located between the polarizer and the quarter wavelength plate, said half wavelength plate having an axis different from the axes of the polarizer and the quarter wavelength plate.

23. The optical element according to claim 2, wherein at least one of the quarter wavelength plate and the half wavelength plate has a refractive index controlled in the thickness direction so as to have an improved angle of visibility.

24. The optical element according to claim 2, wherein the quarter wavelength plate has a phase difference set so as to have a value corresponding to a reflection hue of the bandpass filter.

25. The optical element according to claim 22, wherein at least one of the quarter wavelength plate and the half wavelength plate is made of a liquid crystal polymer material.

26. The optical element according to claim 2, wherein said members constituting the optical element are bonded together by adhesive with removing an air interface.

27. The optical element according to claim 2, wherein said bandpass filter is formed by laminating together thin films of a resin composition respectively having different refraction factors.

28. The optical element according to claim 27, wherein said resin composition is formed into a thin film structure by one-axis stretching or biaxial stretching after it has been extruded into a multilayer structure.

29. The optical element according to claim 2, further comprising a scattering plate located between the bandpass filter and a backlight.

30. The optical element according to claim 29, wherein the scattering plate has an uneven surface on a side thereof facing the backlight.

31. The optical element according to claim 2, wherein the bandpass filter is made of a substrate and a thin film laminate on the substrate, said substrate having an in-plane phase difference of not more than 30 nm between the plane of light incident and the plane of light emission.

32. The optical element according to claim 2, wherein the bandpass filter sets plural selective wavelengths allowed through, and is set so that the incident angles of the respective wavelengths of light, each causing a certain ratio of reflection, are coincident with each other.

33. A surface light source device comprising the optical element according to claim 2, and a backlight that has a three-band cold cathode lamp as a light source so as to emit surface light on the optical element.

34. A surface light source device comprising the optical element according to claim 2, and a backlight that has a light emitting diode as a light source so as to emit surface light having at least one emission wavelength.

35. The surface light source device according to claim 33, wherein the bandpass filter sets plural selective wavelengths allowed through, and has an emission spectrum intensity of the light source of the backlight adjusted according to the transmittance in each of the plural selective wavelengths so that light emitted from the bandpass filter is visually neutralized.

36. A surface light source device comprising the optical element according to claim 2, and a backlight that has an electroluminescence element so as to emit surface light on the optical element.

37. A liquid crystal display comprising a liquid crystal cell, and the surface light source device according to claim 33 for illuminating the liquid crystal cell.

38. The surface light source device according to claim 34, wherein the bandpass filter sets plural selective wavelengths allowed through, and has an emission spectrum intensity of the light source of the backlight adjusted according to the transmittance in each of the plural selective wavelengths so that light emitted form the bandpass filter is visually neutralized.

39. The optical element according to claim 3, wherein a half wavelength plate located between the polarizer and the quarter wavelength plate, said half wavelength plate having an axis different from the axes of the polarizer and the quarter wavelength plate.

40. The optical element according to claim 3, wherein at least one of the quarter wavelength plate and the half wavelength plate has a refractive index controlled in the thickness direction so as to have an improved angle of visibility.

41. The optical element according to claim 3, wherein the quarter wavelength plate has a phase difference set so as to have a value corresponding to a reflection hue of the bandpass filter.

42. The optical element according to claim 39, wherein at least one of the quarter wavelength plate and the half wavelength plate is made of a liquid crystal polymer material.

43. The optical element according to claim 3, wherein said members constituting the optical element are bonded together by adhesive with removing an air interface.

44. The optical element according to claim 3, wherein said bandpass filter is formed by laminating together thin films of a resin composition respectively having different refraction factors.

45. The optical element according to claim 44, wherein said resin composition is formed into a thin film structure by one-axis stretching or biaxial stretching after it has been extruded into a multilayer structure.

46. The optical element according to claim 3, further comprising a scattering plate located between the bandpass filter and a backlight.

47. The optical element according to claim 46, wherein the scattering plate has an uneven surface on a side thereof facing the backlight.

48. The optical element according to claim 3, wherein the bandpass filter is made of a substrate and a thin film laminate on the substrate, said substrate having an in-plane phase difference of not more than 30 nm between the plane of light incident and the plane of light emission.

49. The optical element according to claim 3, wherein the bandpass filter sets plural selective wavelengths allowed through, and is set so that the incident angles of the respective wavelengths of light, each causing a certain ratio of reflection, are coincident with each other.

50. A surface light source device comprising the optical element according to claim 3, and a backlight that has a three-band cold cathode lamp as a light source so as to emit surface light on the optical element.

51. A surface light source device comprising the optical element according to claim 3, and a backlight that has a light emitting diode as a light source so as to emit surface light having at least one emission wavelength.

52. The surface light source device according to claim 50, wherein the bandpass filter sets plural selective wavelengths allowed through, and has an emission spectrum intensity of the light source of the backlight adjusted according to the transmittance in each of the plural selective wavelengths so that light emitted from the bandpass filter is visually neutralized.

53. A surface light source device comprising the optical element according to claim 3, and a backlight that has an electroluminescence element so as to emit surface light on the optical element.

54. A liquid crystal display comprising a liquid crystal cell, and the surface light source device according to claim 50 for illuminating the liquid crystal cell.

55. The surface light source device according to claim 51, wherein the bandpass filter sets plural selective wavelengths allowed through, and has an emission spectrum intensity of the light source of the backlight adjusted according to the transmittance in each of the plural selective wavelengths so that light emitted form the bandpass filter is visually neutralized.

* * * * *